United States Patent [19]

Clemens

[11] Patent Number: 5,412,378
[45] Date of Patent: May 2, 1995

[54] ANTITHEFT PROTECTION OF DEVICES

[76] Inventor: Jon K. Clemens, 1 Bellflower La., San Carlos, Calif. 94070

[21] Appl. No.: 839,129

[22] Filed: Feb. 20, 1992

Related U.S. Application Data

[63] Continuation-in-part of Ser. No. 536,744, Jun. 13, 1990, abandoned.

[51] Int. Cl.6 ............................................. H04Q 1/00
[52] U.S. Cl. .......................... 340/825.34; 340/825.31; 340/426; 307/10.2; 70/278; 235/487; 180/287
[58] Field of Search ........... 340/825.34, 825.3, 825.31, 340/825.32, 426, 310 A; 307/10.2, 10.3, 10.5; 70/278; 235/487; 180/287

[56] References Cited

U.S. PATENT DOCUMENTS

| | | | |
|---|---|---|---|
| 3,337,992 | 8/1967 | Tolson | 340/825 |
| 4,237,375 | 12/1980 | Granholm | 235/487 |
| 4,438,426 | 3/1984 | Adkins | 340/825.32 |
| 4,477,874 | 10/1984 | Ikuta | 340/825.31 |
| 4,733,638 | 3/1988 | Anderson | 180/287 |
| 4,862,139 | 8/1989 | Fukamachi | 340/825.32 |
| 4,868,409 | 9/1989 | Tanaka | 307/10.5 |
| 4,898,010 | 2/1990 | Futami | 70/278 |
| 5,006,843 | 4/1991 | Hauer | 340/825.31 |
| 5,045,837 | 9/1991 | Gosker | 340/426 |
| 5,142,278 | 8/1992 | Moallemi | 340/310 A |
| 5,189,289 | 2/1993 | Watanabe | 235/487 |
| 5,245,329 | 9/1993 | Gokcebay | 340/825.31 |

*Primary Examiner*—Donald J. Yusko
*Assistant Examiner*—Brian Zimmerman
*Attorney, Agent, or Firm*—George E. Kersey

[57] ABSTRACT

Method and apparatus for protecting a device at a first location using an operational member, within the device at the first location, that is activated by a control unit at a second location, separated from the first location, including an activation switch that enables the generation of a signal for rendering the device operational at the first location.

9 Claims, 7 Drawing Sheets

ANTITHEFT PROTECTION OF DEVICES

This is a continuation-in-part of Ser. No. 07/536,744 filed Jun. 13, 1990, now abandoned.

BACKGROUND OF THE INVENTION

The invention relates to the protection of devices, and, more particularly to the protection of vehicles against unauthorized use, including theft.

There are many protective systems, including anti-autotheft systems, on the market today. Most put heavy emphasis on alarms which are triggered when a thief enters a vehicle, or when motion or breakage is detected.

Some of the existing anti-autotheft systems incorporate an "inhibit start" mechanism. The simplest inhibit start makes use of key which is inserted into a key slot and operated. This arrangement, however, poses only a temporary deterrent. Present key systems can be compromised by dismantling and making correct connections to the control wires.

When the key lock is in a steering column, the thief simply dismantles the steering column and reconnects the wires connected to the key switch to eliminate the need for a key.

Other restraining systems are equally ineffective.

Where a steering wheel is looked to an accessory of the vehicle, the thief simply bypasses the restraint and places the vehicle in operation.

Warning systems are also ineffective. A clever thief either disables or ignores them. The accidental tripping of sound emitting warning devices is so well known that the alarm is typically ignored.

Electronic units that emit tracing signals, on the other hand, are of assistance in recovering vehicles once they are stolen, but they do not hinder the initial theft. Moreover, such units are cumbersome and expensive.

Complexity, expense and ineffectiveness also characterize prior art of the kind for attempting to protect an automobile against theft disclosed in Hauer U.S. Pat. No. 5,006,843; Nieuwkoop, U.S. Pat. No. 4,864,292; Fukamachi et al, U.S. Pat. No. 4,862,139; Adkins et al U.S. Pat. No. 4,463,340; and Adkins U.S. Pat. No. 4,438,426.

Thus Hauer discloses a complex security system in which a micro-chip code module is mounted inside a motor accessory. The micro-chip code module is a silicon substrate with an added semiconductor switch in the engine compartment of the vehicle, and is controlled from a microprocessor in the dashboard of the vehicle.

The microprocessor includes a keyboard and a code sender with components joined by a data bus. The code sender components include a processor, a program memory, a data memory, a line interface and a key board interface.

The keyboard interface, in turn, connects a data bus to a keyboard. The line interface connects the data bus of the code sender in the dashboard to the code module in the engine compartment by three "Receive", "Transmit" and "Ground" lines.

Power for the keyboard, the code sender and the code module is applied only when an ignition key of a three-position ignition switch is moved from the "off" to the "on" position. When the ignition key is moved further to the "start position" power is applied to a starter relay which will allow starter current to flow to a starter motor if the semiconductor switch has been closed by the code module.

In order for the semiconductor switch to be closed, it is necessary for an "AND-OR latch" to have been operated. The latch is operated in response to the momentary presence of a "good word" signal. Because of the latch characteristic, the output from the latch, after momentary enablement, returns through its internal OR gate to an input of its internal AND gate. The latch therefore remains enabled by DC power on the remaining terminal of the internal AND gate. Accordingly, the latch will provide an output as long as DC power is supplied.

Hauer emphasizes that a "good word" signal will transfer the AND/OR gate latch into the high state and will open up the starter transistor to prepare for the immediately following start command. The transistor will allow the start command to be executed and will remain conductive until the engine is turned off.

With respect to the keypad and the code sender in the dashboard, the processor within the code sender is programmed so that after the ignition key is turned "on", there is a search in the data memory for a "status byte". If the status byte indicates that the unit is disarmed, the processor reads the operating code word in the data memory. The code word is then delivered to the line interface and the vehicle can be started.

If the status byte indicates that the unit is armed, the processor delivers a code request to the key board interface. After the code word is entered at the keyboard, the processor scans the keyboard and passes the entered code word to the line interface.

It is to be noted that although Hauer includes a "program timer" in his code module, the only purpose of the timer is to respond to a "bad word signal", so that the occurrence of more than three bad word indications will disable the security circuit. It is to be further noted that there is no timer in the code sender.

Another example of complexity is demonstrated by Nieuwkoop, U.S. Pat. No. 4,864,292, in which a complex identification system includes an induction coil acting with respect to an integrated circuit responder for use in entering a normally locked door by detecting variations of an electromagnetic field.

Even more complexity is associated with Fukamachi et al, U.S. Pat. No. 4,862,139, which discloses a key operated antitheft system with two embodiments. In the first embodiment, a door key is inserted into a key slot containing a sensing device. This generates a signal in a control circuit mounted in the vicinity of the dashboard.

In the second embodiment, a key having circuitry is inserted into a key slot. This energizes the door lock device and the protection device which includes a third key sensing portion and an engine start disabling circuit. The signal generated by the control circuit merely provides a ground to the pre-existing solenoids associated with the fuel injection device and the motor.

In Fukamachi a starter cut relay is kept energized until the alarm permission mode is canceled to prevent an engine from starting. The switching action requires that a switch must be closed to permit starting. In addition since the relay operates from a dashboard located control circuit, it logically is in the vicinity of the control circuit.

The Fukamachi vehicle is provided with a protection device, which is a third key sensing portion of a similar construction to that of a second key sensing portion, an engine start disabling circuit, and an anti-theft alarm circuit. The key sensing portion is in the key inserting hole of an ignition switch. The engine start disabling circuit and the anti-theft alarm circuit are rendered operative in response to output signals from a keyless lock detecting circuit, and are rendered inoperative by a signal output circuit. Thus the protective circuitry has a sensing portion associated with an entry key, and is at a readily accessible location. A signal is extended to conventional relays to supply them with a ground or a voltage, so that the system is easily defeated by grounding the lead from the signal source.

In Fukamachi even if one can enter the passenger compartment after breaking the door lock, one cannot overcome the engine start disabling circuit without using the proper key. The start disabling circuit is formed by conventional relays which are supplied with a ground or signal from a sensing circuit associated with the key. Thus the system is easily overcome by grounding.

Finally, Fukamachi states "The open-closed state detecting circuit is adapted to supply the engine start disabling circuit and the alarm circuit with a signal indicative of the open states or closed states of the various coverings (doors, trunk, bonnet, etc.)". This is a further reference to the so-called "disabling circuit" which is readily accessible.

Complexity also characterizes Adkins et al, U.S. Pat. No. 4,463,340, where an ignition control switch is within a receiving module and remote from the ignition. Moreover, the sending module includes a comparator which detects an input code and actuates an encoder if there is a match with a code in storage. As a result, the system can be defeated by opening the module and activating the encoder. Adkins also provides transmission of encoded signals upon the power supply of an automobile in a way that interferes with proper functioning of circuitry that responds to the code signals.

Another easily defeated system is to be found in Adkins U.S. Pat. No. 4,438,426 which shows a decoder for transmitting a signal to an ignition enabling circuit. The decoder produces an enable signal after decoding a preselected code. An ignition enabling mechanism is connected with a decoder for selectively enabling an automotive ignition to be operated in response to the receipt of the decoder enable signal. An automatic reset is connected with the ignition enablement for automatically disabling the ignition within a predetermined duration of ceasing operation of the ignition. An electrical jack which is operatively connected with a decoder is mounted to receive an electrical plug from the exterior of the vehicle.

As in Fukamachi, the switch in Adkins '426 that is controlled by a decoder and is in the vicinity of an ignition switch where it is readily accessible to an unauthorized user. Confirmation of the driver's compartment location of the decoder is seen by the use of a valet switch which must be near the driver. The objective in Adkins is to have an alarm system that will keep unauthorized drivers out of the driving compartment, not to prevent starting of the engine. In any event, the Adkins' system is easily defeated by pulling out the valet switch and applying battery power to the wiring of the switch. Adkins emphasizes that not only will the car start without the ignition key being used, but the alarm system will be shut down as well.

Accordingly, it is an object of the invention to facilitate the protection of devices. A related object is to facilitate the protection of movable devices. Another related object is to facilitate the protection of vehicles, including automobiles and utility vehicles.

Another object of the invention is to maintain the protection of vehicles even when the integrity of a key-lock arrangement is compromised. A related object is to keep the vehicle inoperative after a conventional inhibit start arrangement is disabled.

A further object of the invention is to achieve protection without the need for a warning system. A related object is achieve protection without the need for tracing signals.

SUMMARY OF THE INVENTION

In accomplishing the foregoing and related objects, the invention provides an arrangement that differs in function from those of the prior art. The invention prevents the vehicle or device from being started or operated by an unauthorized person.

The invention can be used in conjunction with alarm systems if desired, but it provides an entirely independent function. The invention differs from the other "inhibit starts" in that no rearrangement of the wires connected to the control unit will allow the vehicle or device to be started or operated. The control unit sends a coded signal to a remote switch which makes the required connection to start the car or enable the device. Without the correct code, the thief will not be able to activate the remote switch even if he has a complete knowledge of the system. He will have to locate the remote switch which is buried in the engine compartment or device and bypass the switch in order to start the car or activate the device. This will be very time consuming and will put the thief at too high a risk to continue in most cases.

The invention is in accordance an ideal anti-theft system because it prevents a car from starting or a device from operating. The invention has the property that it cannot be defeated from a control or drivers compartment by even a knowledgeable thief. The invention is activated automatically so that a driver or operator cannot forget to set it. And finally the invention is inexpensive and easy to install.

The heart of the invention is in the remote placement of a switch which is controlled by a code from a sender or controller in the driving or control compartment of a car or device. The remote switch is installed in a path or wire supplying power or a critical signal to a necessary part of a power or starting system. In the case of a vehicle such a path contains a coil, starting solenoid or fuel pump. When the switch is open, the critical signal cannot pass through the switch to the starting system component and the vehicle cannot start. When the switch is closed the critical signal passes and the car can start. Each remote switch includes a detector for one of a large number of unique codes. The detector can be an integrated circuit.

The control unit is located in the drivers compartment and sends the unique code to the remote switch. However, the control unit contains no codes. The control unit reads the code from a "key" such as a magnetic card and sends the code to the remote switch. As a result the control boxes in all systems are identical. The control boxes merely read the code and send it on.

The code key is carried by the owner/driver of the car along with car keys. The code can be on a magnetic card or in a small infrared or microwave unit that sends the code to the control unit when a button is pushed. In this manner the driver can start the car in a normal manner except that there are two keys rather than one.

The remote switch is designed to open when the ignition of the car is turned off and requires a new insertion of the code to start the car again. A timing device is included so that repeated attempts to start a stubborn car do not require a separate insertion of the code each time.

As noted above, the primary feature of the invention is the use of a supplemental remote switch which desirably includes a decoder. Such a switch is not to be found in the the prior art. Thus the enabling switch in Adkins '426 adjoins the automotive ignition key. Similarly the ignition control switch in Adkins '340 is in the vicinity of the vehicle ignition key switch. In Fukamachi any switching that takes place is within a dashboard-mounted control panel, with a line extended to the ignition components.

Any attempt to treat the switches in the references as "remote" within the meaning of the invention can only be made with exercise of hindsight in the light of the invention.

The invention further provides an anti-theft system for protecting a device at a first location by an operational member in the device at the first location, which is operated with respect to a control unit at a second location, separated from the first location. The control unit repeatedly reproduces a control signal for repeatedly rendering the device operational at the first location. The first location is inaccessible from the second location and includes a remote switch which incorporates code recognition circuitry for a unique code. The remote switch remains in an open state until supplied with the unique code and further remains in a closed state only while the switch receives the unique code.

In apparatus in accordance with the invention for protecting a device at a first location, an operational member includes a switch in the device at the first location, and a control unit at a second location, separated from the first location, is initialized, and an instrumentality in the control unit is energized independently of the initialization causes the control unit to generate a signal for rendering the device operational at the first location.

In an anti-autotheft system of the invention, the switch is installed in an automobile location outside of the driver's compartment, and the transmission of the control signal is energized by an ignition switch.

The remote switch can be connected in a line to interrupt the application of a critical signal or power level to a critical operational component remote from the remote switch, which includes a code detector, a timer responsive to the code detector and a switch responsive to the timer.

The remote switch can include a timer that responds to the output of a code detector for a unique code and causes the switch to remain closed for a prescribed period of time after the removal of the unique code.

An anti-autotheft system of the invention can include a control unit mounted inside the driver's compartment and adapted to transmit the code signal to the switch without wire. Alternatively, an unbranched single wire is connected between the control unit and the remote switch to carry both DC power and a code signal from the control unit to the remote switch.

The control unit of an anti-theft system can include a code reader, a code memory for storing the code read from the reader and a code repeater operated to repeatedly send a unique code. The code reader can be a magnetic card reader which reads code from a magnetic card and transmits the code by a sender including a code memory for the code read from the magnetic card, a repeater for repeatedly sending the code and a timer for keeping the code memory active for a prescribed period of time. The code reader can be of the infrared or microwave type with an ignition actuated repeater for repeatedly reproducing the code that has been read.

The control unit can include a code memory and a repeater to send the code continuously to maintain enablement of the remote switch. In one embodiment, the ignition switch must be on for the control unit to send out the signal. The control unit can include a reader for the signal and a timer to allow a period of time between when the reader reads the signal and the ignition switch is turned off.

An anti-autotheft system of the invention can include a code memory which is automatically erased when the ignition switch is turned off in order to arm the anti-autotheft system automatically when the driver leaves the automobile. The anti-autotheft system can include a code memory and a timer which allows the ignition switch to be turned off for a short interval without erasing the code memory to allow repeatedly turning the ignition switch on-and-off.

In a method of protecting a device at a first location, the steps include (a) providing an operational member in the device at the first location; (b) providing a control unit at a second location separated from the first location; and (c) operating an ignition switch to activate the control unit and generate a signal for rendering the device operational at the first location.

In the method the operational member is positioned within the device and the control unit is separately positioned within the device and displaced from the operational member, with the signal transmitted along a single path from the control unit to the operational member. The first location is remote from the second location and includes a remote switch which contains code recognition circuitry for a unique code, with the remote switch remaining in an open state until supplied with the unique code and further remaining in a closed state only while the switch receives the unique code.

DESCRIPTION OF THE DRAWINGS

Other aspects of the invention will become apparent after considering several illustrative embodiments, taken in conjunction with the drawings, in which:

FIG. 4C is a schematic diagram showing an alternative automobile containing the three principal components of an anti-autotheft system without the employment of any connective wiring in order to enhance the antitheft capabilities of the invention.

DETAILED DESCRIPTION

Overall Protective System

Figure 1A:
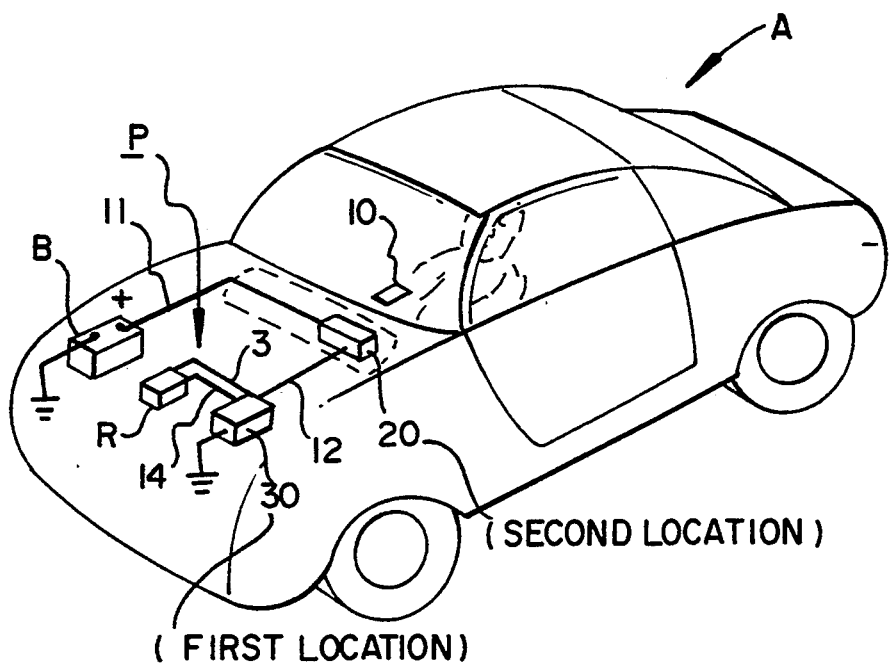
FIG. 1A is a schematic diagram showing an automobile containing the three principal components of an anti-autotheft system in accordance with the invention.

With reference to the drawings, a protective system P in accordance with the invention is shown in FIG. 1A installed in an automobile A. The protective system P includes only three components which are energizable by a standard battery B of the automobile A. The principal components of the invention are an activator 10, a control unit 20, and a remote switch 30. The activator 10 is illustratively a magnetic card which is employed by the occupant of the automobile A to permit the starting of a protected automobile A, in conjunction with the operation of the ignition switch for the automobile.

DC energy for the ignition switch and the control unit 20 is provided from the battery B over a line 11. Once the magnetic card 10 has been inserted temporarily into the control unit 20, a repeated and unique code signal is sent to the remote switch 30 over a line 12 after the ignition has been operated. Upon receipt of a proper and repeated code signal, an internal member of the remote switch 30 operates to enable a critical remote part R of the automobile with respect to lines 13 and 14. One of the lines, 13 or 14, extends to the remote part R and the other line, 14 or 13, extends from the remote part R, which may be a starting solenoid or any other crucial component of a automotive system.

It will be appreciated that the remote switch 30 is at a first location which is separated and relatively inaccessible from the control unit 20 which is at a second location. The control unit 20 is mounted near a driver or custodian in the driver compartment of the vehicle A, or in some other custodial compartment (not shown) which may be remote from the vehicle A.

The driver enters the car, or the custodian enters the custodial compartment, and uses the control key 10. When the control key 10 is a magnetic card, it is inserted into the control unit 20. When the card 10 is removed, the driver proceeds to start the car in the normal manner.

Mounting of the Control Unit 20

Figure 1B:
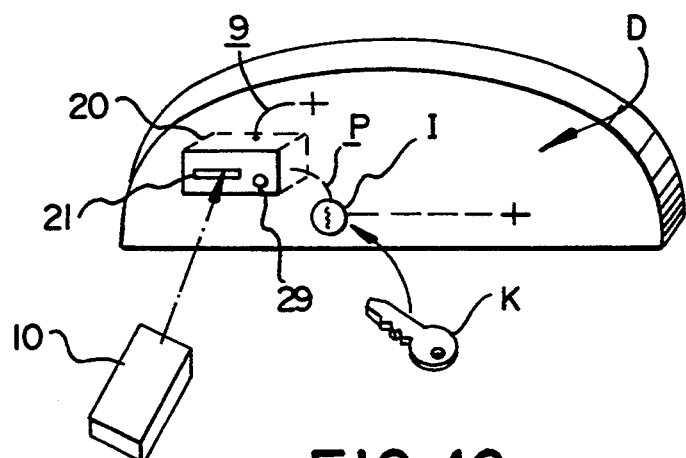
FIG. 1B is a schematic diagram illustrating placement of the control unit in the dashboard of the automobile and activation by a magnetic card.
Figure 1C:
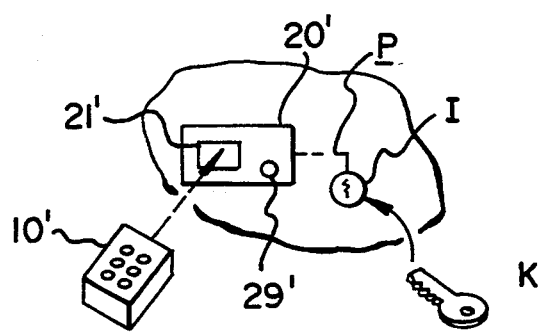
FIG. 1C is a schematic diagram illustrating placement of the control unit in the dashboard of the automobile and alternative activation by an infrared transmitter.

As shown in FIG. 1B, the control unit 20 is conveniently mounted in the dash board D of the automobile A in the vicinity of the ignition housing I for an ignition key K. The magnetic card 10 is inserted into the control unit 20, followed by normal operation of the ignition key K. Alternatively, as shown in FIG. 1C, the control unit 20 has a window 21' and the enablement component 10' is a conventional infrared transmitter similar to that commonly employed with remote control television sets.

Simplified Showing of Principal Components

Figure 1D:
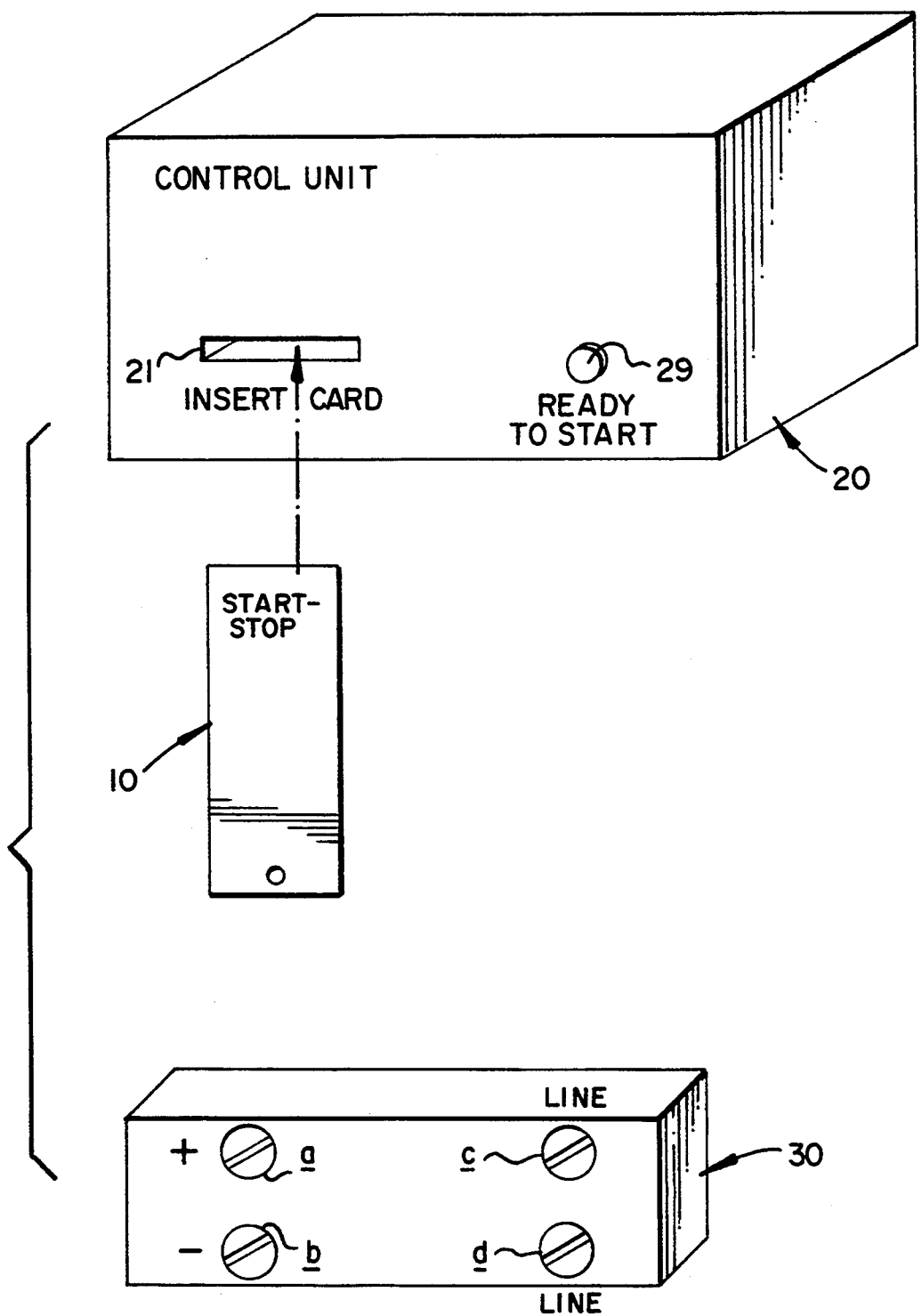
FIG. 1D is a diagram which depicts, in block form, the three principal components of the invention, namely a control unit, a remote switch, and an activating member for the control unit; the system is completed by the addition of wiring or signal transponders.

For simplicity, the three principal components of the invention are emphasized in FIG. 1D as being an illustrative magnetic card key 10 for start-stop operation, the control unit 20 with a slot 21 for insertion of the magnetic card key 10 and an indicator light 29 which advises the operator that the ignition I can be employed to generate repeated code signals which are transmitted to the remote switch 30 to the positive terminal a in order to close the line c from a critical remote part R (FIG. 1A) to the line d that extends to the critical remote part R. The negative terminal b of FIG. 1D is grounded as shown in FIG. 1A.

Details of Control Unit 20

Figure 2B:
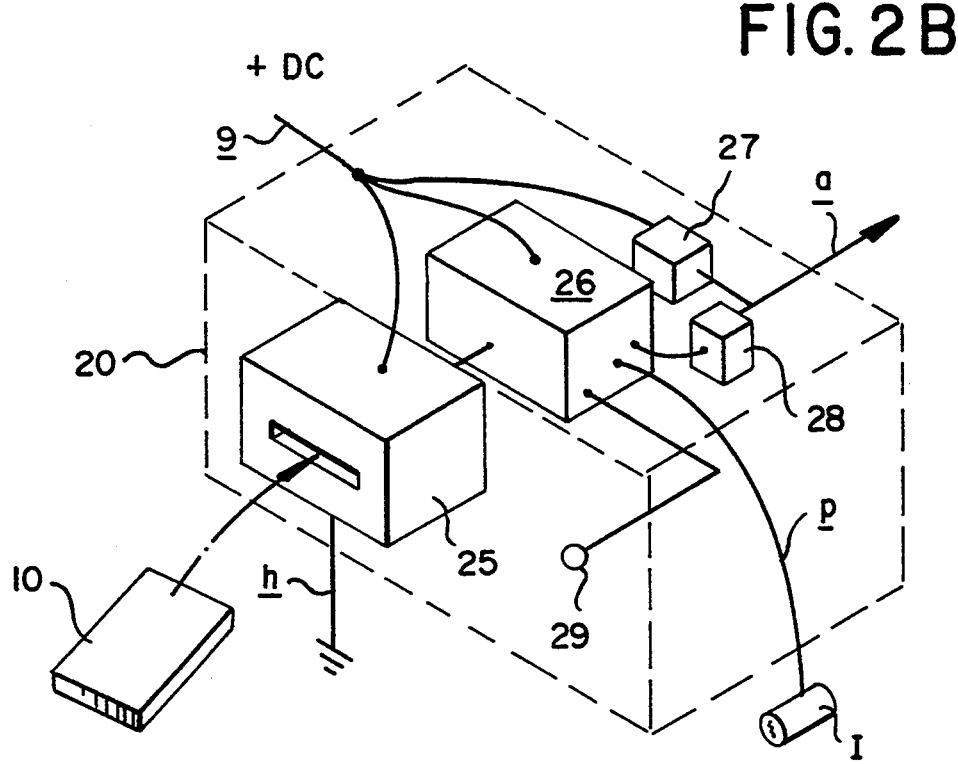
FIG. 2B is a diagram illustrating in block form the components of FIG. 2A in the dashboard of the automobile for an anti-autotheft system.
Figure 2D:
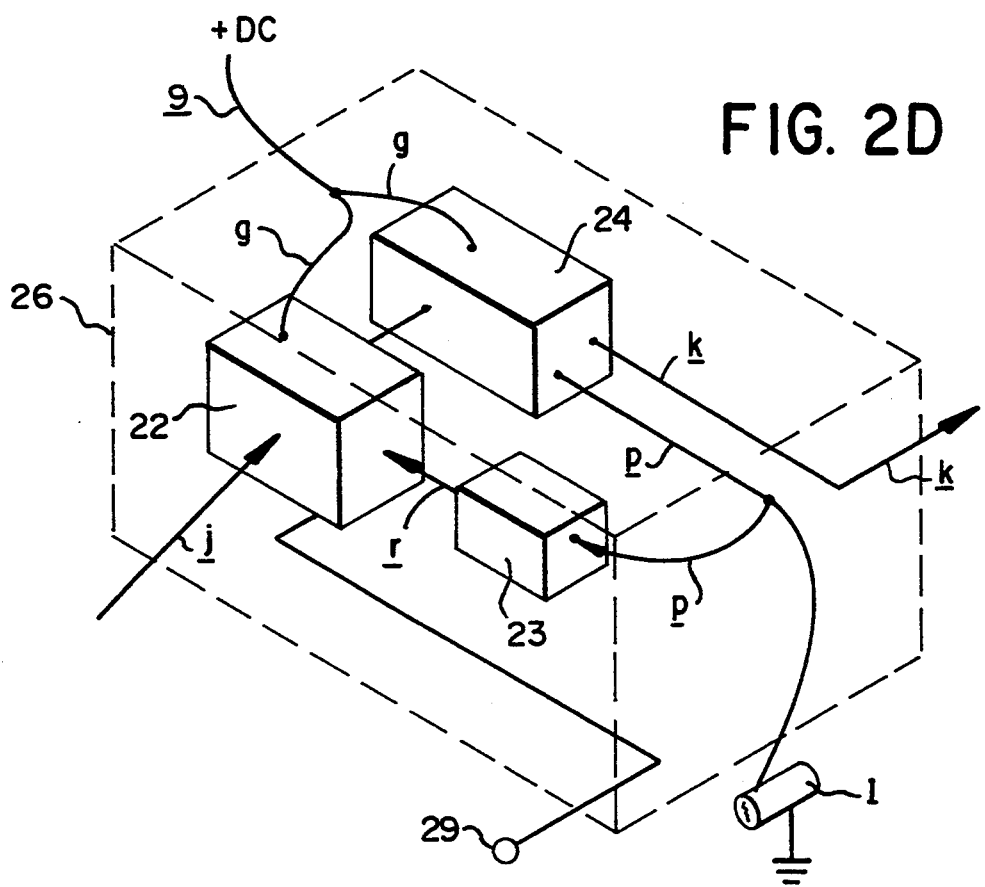
FIG. 2D is a diagram illustrating in block form the components of FIG. 2C in the code sender of an automobile for an anti-autotheft system.
Figure 2A:
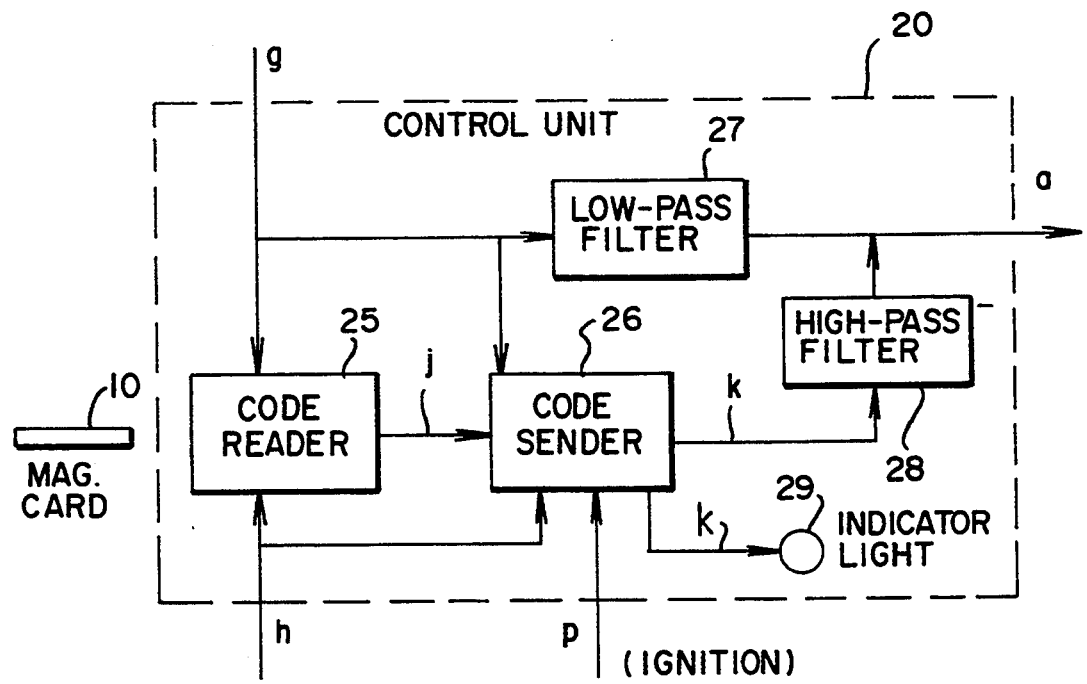
FIG. 2A is a block diagram for the control unit of FIGS. 1A through 1C, which can be located in a driver's or controller's compartment.

Details of the control unit 20 are as shown in FIG. 2A. There are three lines or electrical paths g, h and p into the control unit 20. Line g supplies DC (direct current) power from a fused source (not shown) such as an automotive battery B (FIG. 1A). Line h provides the necessary ground connection for the control unit 20. The remaining input line p provides a voltage level from an ignition, such as the ignition I of FIG. 1B, or other external switch (not shown).

Figure 3A:
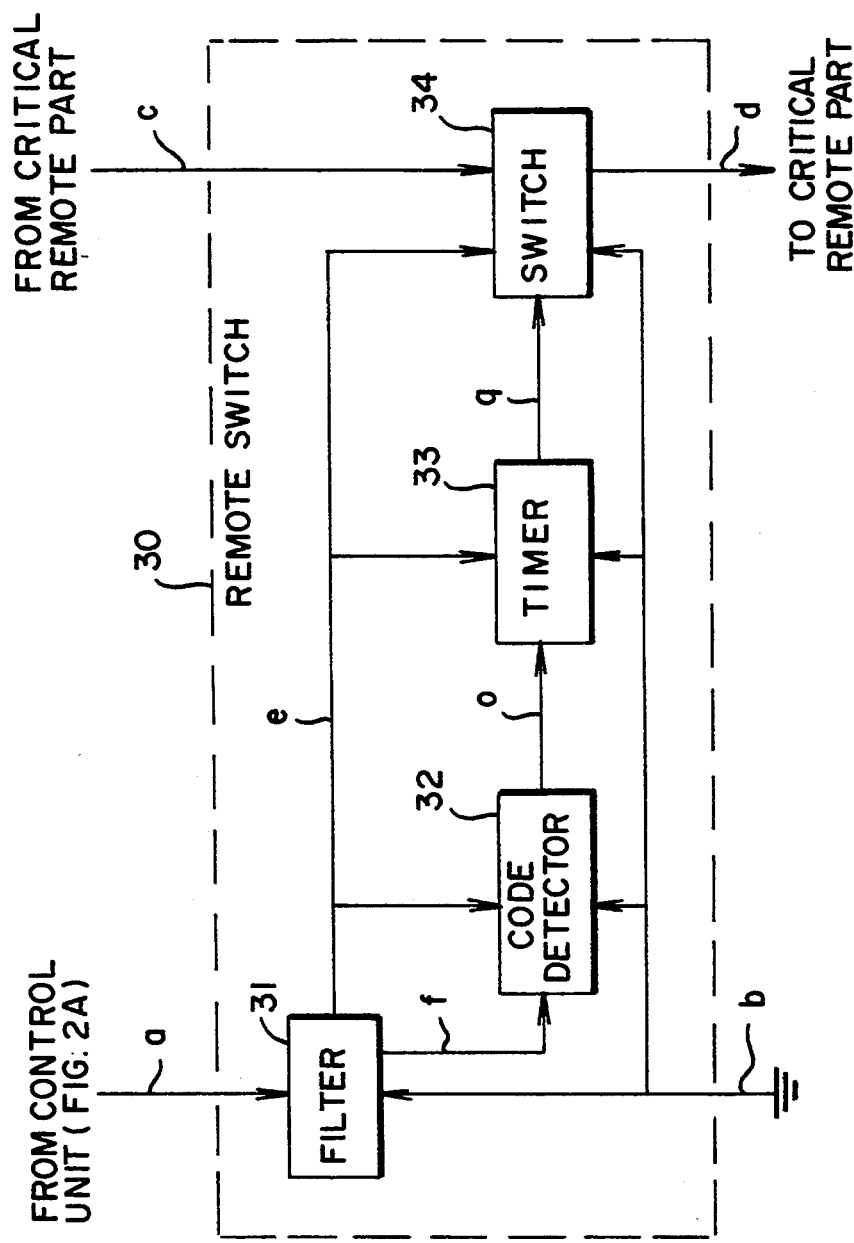
FIG. 3A is a block diagram of the remote switch which receives code signals from the code sender of FIGS. 2A through 2D mounted remotely in an engine compartment as shown in FIG. 1A, or elsewhere.

There is a single output line or path a from the control unit 20 that extends to to the remote switch 30 of FIG. 3A.

Within the control unit 20, the magnetic card 10 is read by a card reader 25. The magnetic card 10 contains the private code that allows the car A to start. The magnetic card 10 of FIG. 1B is but one common method of performing the coding function.

Another method is by use of a small infrared or microwave transmitter, illustratively of the kind shown in FIG. 1C. In such a case the driver points the transmitter at the control unit 20 and pushes one or more buttons to transmit the code to the code reader 25.

A further method is by a set of buttons (not shown) on the control unit 20 to allow the driver to enter the correct code from memory.

Once the code is entered, the card reader 25 passes the code to the code sender 26 by a path j. The code sender 26 continuously sends the code signal out on path k, all the time while the ignition switch I is turned on. In addition, the code sender 26 lights an indicator light 29 by way of a line m to indicate to the driver that the car can be started. Other properties of the code sender 25 are described below and illustrated in FIG. 2B.

In the control unit 20 of FIG. 2A, a high-pass filter 28 provides for coupling the code signal onto the same wire or path a that supplies DC power to the remote switch 30. The code signal is rapidly changing, and in practice the high-pass filter 28 may be a single capacitor that provides suitable capacitive reactance. The code signal then passes to line a. A low-pass filter 27 allows direct current (DC power) to flow from the line g to the line a, but blocks the code signal from passing from line a to line g. As a result, the high frequency code signal is prevented from flowing onto DC lines to other equipment in the car A. The presence of the high frequency code signal on other lines can cause interference with other automotive components, such as the computer of the car.

If the code signal can be sent safely on the regular DC power lines of the car, no separate wire a would need to be connected to the remote switch 30 of FIG. 3A. The remote switch 30 would be able to pick up the code signal wherever it is connected to DC power.

In practice the low-pass filter 27 in the control unit 20 of FIG. 2A can be a single inductor or other suitable unit that provides adequate inductive reactance.

In the embodiment of FIG. 1A, the line a is the only conductor that needs to be routed to the remote switch 30 during installation of the protective system P. It may be convenient also to include a ground wire, but ground usually can be found at any remote location.

The various components of the control unit 20 are further illustrated in block form in the diagram of FIG. 2B. It will be appreciated that the block form does not represent the actual implementation of the invention in which the entire control unit is mounted on a single semiconductor chip.

Details of the Code Sender 26

Figure 2C:
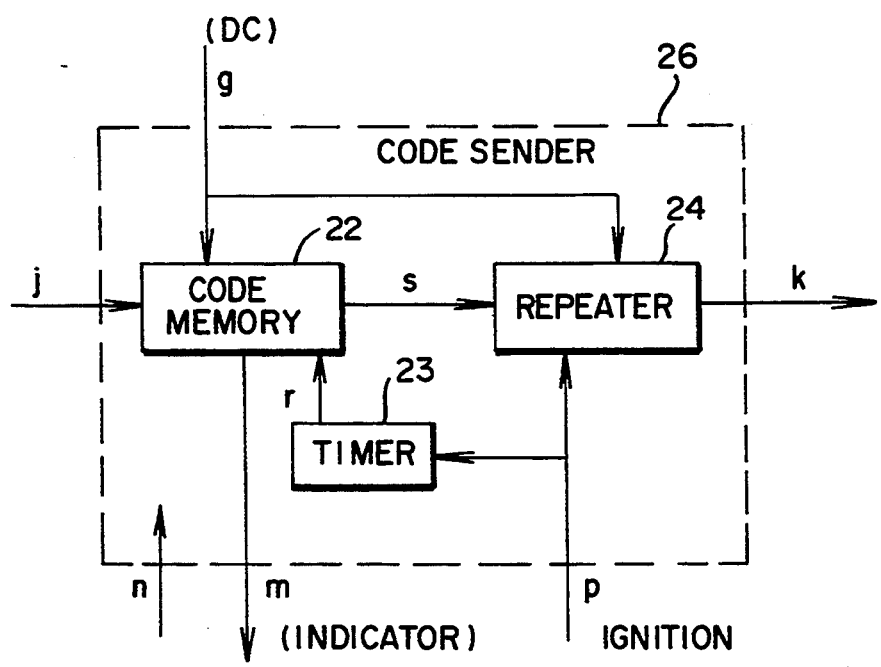
FIG. 2C is a block diagram of a code sender for the control unit of FIG. 2A.

Details of the code sender 26 are described in FIG. 2C. The lines into the code sender 26 are g to supply DC power, to supply the code, h to provide a ground connection, and p to supply voltage from the ignition switch I.

When the card reader 25 of FIG. 2A sends the code to the code sender 26 (shown as a block in FIGS. 2A and 2B), the code is stored in a code memory 22 of FIG. 2C. The code remains in the memory 22 until the ignition switch (not shown in FIG. 2C) has been turned on, it remains thereafter until the ignition switch has been turned off for a prescribed period of time.

The desired retention of the code in the memory 22 is accomplished by a reset function for the memory 22, as controlled from a line r. When the ignition switch is turned on, a voltage appears on line p. A timer 23 causes a relatively high voltage to appear on line r and remain even if the ignition switch is turned off for a short period of time. The duration of the timer voltage is typically 1 minute. This allows the driver to turn the ignition switch off-and-on several times in trying to start a car.

When the ignition switch is off for more than the timer interval, for example 1 minute, the timer 23 returns the line r to a relatively low voltage, and the code memory is set to zero. When this happens the car cannot be started until the magnetic card 10 is reinserted into the card reader 25. The line m from the code memory 12 is at a relatively high voltage level whenever the code memory 12 is not at zero.

As noted above, line m is used to light an indicator 29 (FIGS. 1B and 2A) to let the driver know that the car can be started. The indicator light 29 will light whenever a card 10 is inserted into the card reader 25 whether it is the correct card or not. However, the car will not start with the wrong code. In order to promote the security of the protective system, the code detector 32 (shown in FIG. A) should be in the remote switch 30 and only in the remote switch.

Therefore, the control unit 20 cannot determine whether or not the code is correct; it can only determine that a code has been entered into the code memory 12. The repeater 24 of FIG. 2C functions only when the ignition switch is on and therefore the line p is in a relatively high voltage state.

In operation the repeater 24 reads what is in the code memory 22 by way of path s and continuously repeats the code, sending it out on line k. An alternative approach is by sending a code to the switch 34 of FIG. 3A in order to close it and permit the car to start. While the car is running, the code is not repeated. When the ignition is turned off, a second code (which can be the same for all units) can be sent to the switch 34 in order to cause it to open.

Consequently the code is sent to the remote switch 30 only if both the code memory 12 has the code in it and the ignition switch I is on.

The components of the code sender 20 in FIG. 2C are further illustrated in three-dimensional block form in FIG. 2D. It will be appreciated that the block form does not represent the actual implementation of the invention in which the entire control unit is mounted on a single semiconductor chip.

Details of the Remote Switch 30

As shown in FIG. 3A, the remote switch 30 has a line a from the control unit 20 with both DC power and the code signal. Line b is a ground connection which can accompany line a or be made locally. Lines c and d are the two ends of a severed line going to a critical starting component of the car.

In practice, the ends c and d are from a line supplying power to the starter solenoid, the coil, the electric fuel pump, the computer of the car, or some other critical starting component. The two ends c and d and are connected to the remote switch 34. A filter 31 separates the DC power from the code signal. This filter includes a high-pass section, typically a capacitor, and a low-pass section, typically an inductor. DC power is supplied at the output of the filter 31 on a line e, and the code signal is supplied at the output of the filter 31 on a line f.

A code detector 32 compares the incoming signal with the code stored in its memory. A specific code is inserted into the memory of the code detector 32 when its chip is processed, and cannot be changed. When the incoming code signal matches the code that is in the memory of the code detector 32, a pulse appears on line o. The pulse is passed to a timer 33, which generates a longer pulse causing line g to remain at a relatively high voltage level for a further prescribed period of time (typically 2 minutes).

When line g is high, the switch 34 closes. Switch 34 is closed if, and only if, line g is high. Therefore, the car cannot start if line g is low. In fact, a running car will stop if line g goes low. Since the code sender 26 of FIG. 2C sends the correct code continuously, there will be a series of pulses from the code detector 32. Typically, more than 100 pulses will be sent to the timer 33 during the two-minute duration of the timer pulse. This is done for safety reasons. If a malfunction occurs, such as terrible electrical noise or a loose connection, and only 1% of the codes are correctly detected, the car will start and run.

Figure 3B:
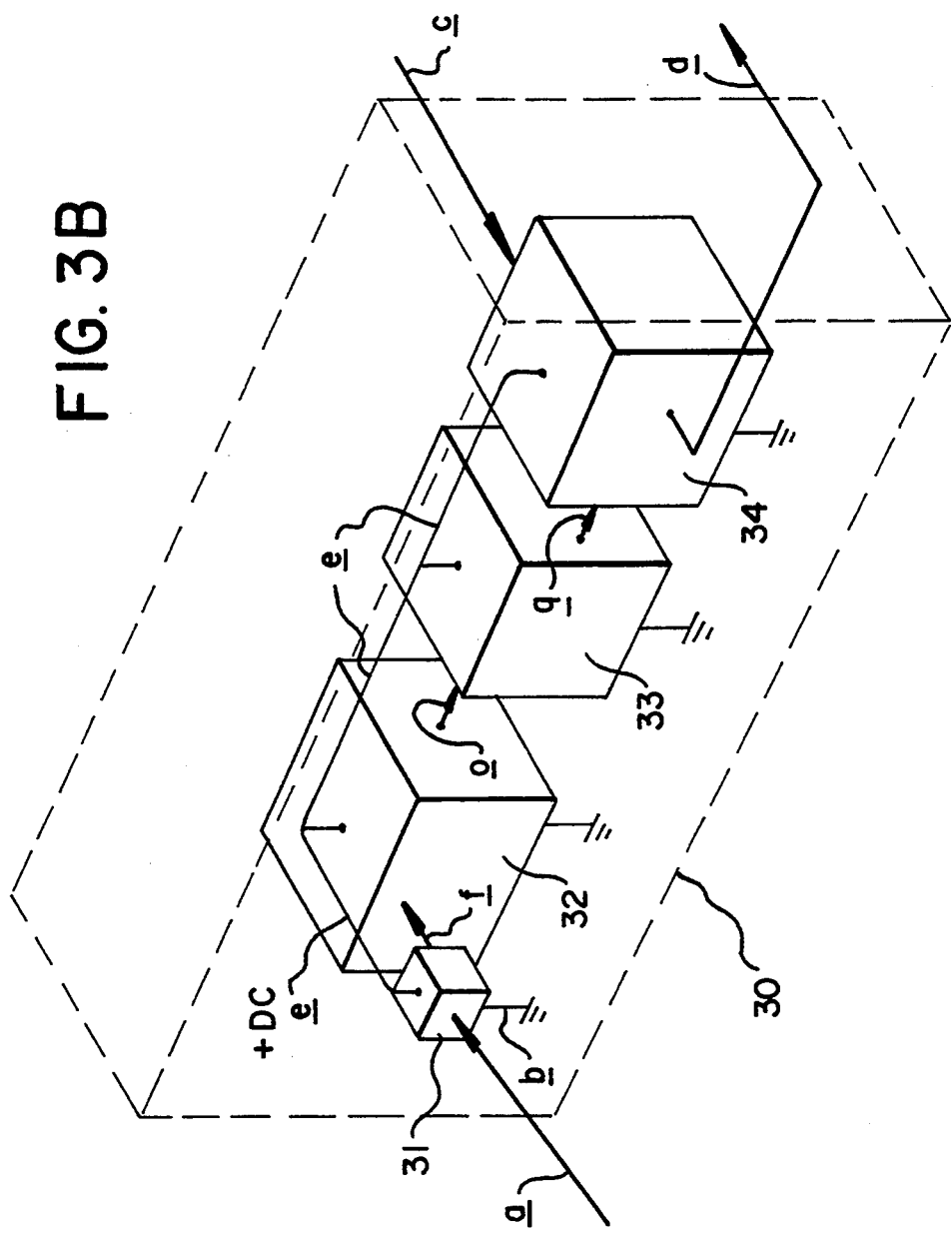
FIG. 3B is a diagram illustrating in block form the components of FIG. 3A in the remote switch of an automobile for an anti-autotheft system.

The components of the remote switch 30 in FIG. 3A are further illustrated in three-dimensional block form in FIG. 3B. It will be appreciated that the block form does not represent the actual implementation of the invention in which the entire control unit is mounted on a single semiconductor chip.

Installation of the System

During installation, the control unit 20 in FIGS. 1A and 2A is mounted near the driver in the driving compartment. It is connected to the DC power source and the instrument power which is activated by the ignition switch. In addition, a ground connection is required. A single feed wire, or a single wire and ground wire, is extended into the engine compartment, or under the car, or wherever the remote switch 30 is located.

The remote switch 30 is very small and can be taped to existing wiring rather than be mounted, if desired. A wire to a critical starting component is severed and the ends are connected to the remote switch 30. In addition, a line from the control unit 20 and a ground connection must be joined. More security can be provided by adding one or more remote switches to the system. In such a case all remote switches 30 will have the same code and be made as a set in manufacturing. All of the remote switches 30 can be connected to the same wire.

Wireless Transmission of Code Signals

Figure 4A:
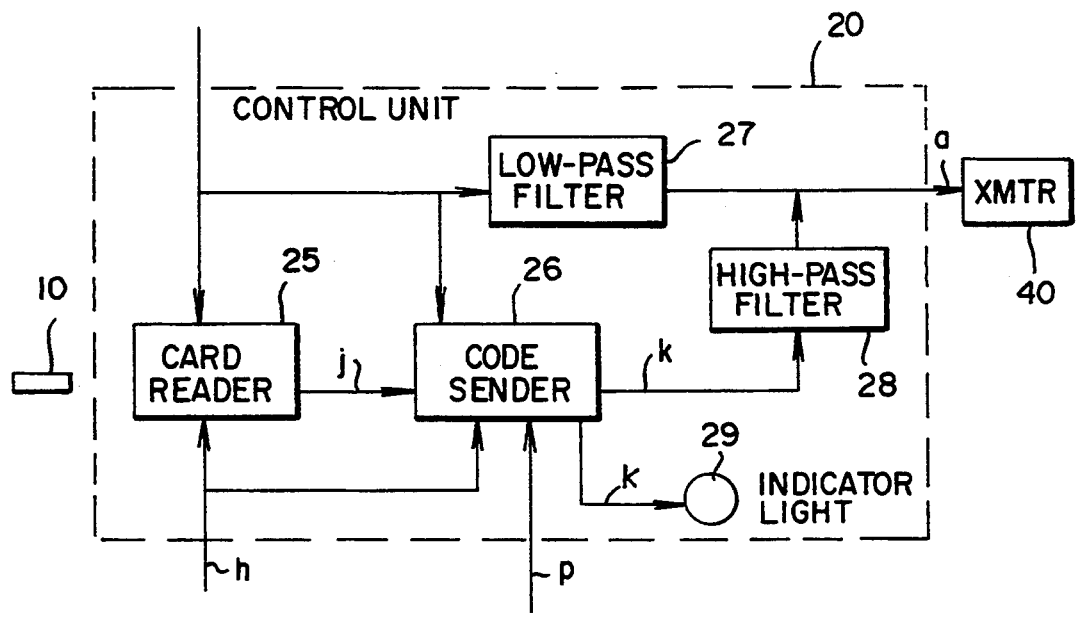
FIG. 4A is a block diagram of an alternative control unit for the system of FIG. 1.

FIG. 4A shows an embodiment of the invention in which the output line a of a control unit 20 in FIG. 4A terminates in a transmitter 40. As a result, the output line does not extend to a remote switch, but instead the transmitter 40 sends a modulated code signal to a receiver.

Figure 4B:
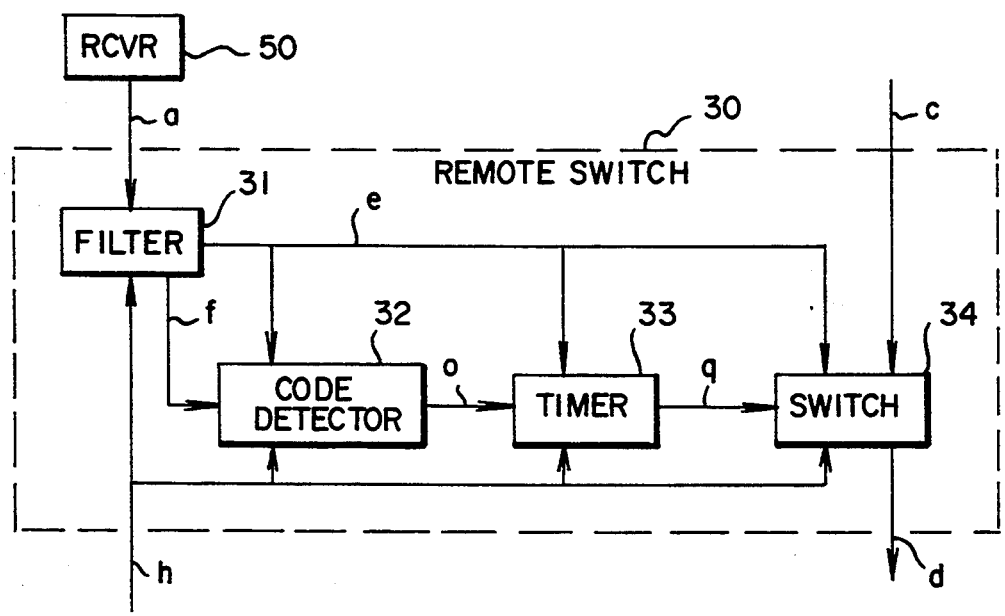
FIG. 4B is a block diagram of an alternative remote switch for use with the control unit of FIG. 1.

As shown in FIG. 4B, an appropriate receiver for the output of the transmitter 40 in FIG. 4A is the receiver 50 associated with the remote switch 30. The receiver 50 is connected to the input line a in place of having the line a extend from the control unit of FIG. 4A.

The advantage of the embodiment illustrated in FIGS. 4A and 4B is indicated in FIG. 4C which shows that there is no line, like the line 12 of FIG. 1A, extending between the control unit 20 and the remote switch 30. As a result, even if an unauthorized user is able to locate wiring associated with the control unit 20, he cannot following that wiring to the remote switch. 30.

It will be understood that the foregoing description is illustrative only and that various modifications and adaptations will be readily apparent to those of ordinary skill in the art.

What is claimed:

1. Apparatus for protecting a vehicle from unauthorized operation, said vehicle having a first location not accessible from the operator's compartment and containing at least one critical operational component which must be enabled for said vehicle to operate, and a second location which is accessible from the operator's compartment, comprising:

activator means having stored therein a coded signal selected from a plurality of coded signals;

control means positionable at said second location and having a memory means including a first input for receiving said coded signal from said activator means and a second input, which when enabled by an initializing signal from the ignition switch, causes said control means to repeatedly produce said coded signal as long as said initializing signal is in an enabled state; and means positionable at said first location including a code detector means for receiving said coded signal and comparing the same with a stored signal, and a switch means connected to said critical operational component so that when said coded signal matches said stored signal said switch means is closed thereby enabling said critical operational component.

2. Apparatus according to claim 1, wherein said control means is a positioned in the operators compartment accessible to the operator when the vehicle is being started.

3. Apparatus according to claim 2, wherein said activator means is a magnetic card which can be inserted in said control means so that said coded signal can be downloaded and said magnetic card removed, so that when the ignition switch is turned on, said initializing signal causes said control means to repeatedly transmit said coded signal to said code detector.

4. Apparatus according to claim 1, wherein said activator means includes an infrared transmitter, and wherein said control means includes a receiver for receiving a infrared signal on which said coded signal is modulated.

5. Apparatus according to claim 2, wherein said control means further includes an light which is visible to the operator to provide an indication that the vehicle can be started in the normal manner.

6. Apparatus according to claim 1, wherein said means positioned at said first location is connected to the output of said control means at said second location by a single wire, and wherein said control means includes a high pass filter connected between said memory means and the output of said control means so that both said coded signal and operating power for said switch means can be supplied to said first location on said single wire.

7. Apparatus according to claim 1, further including a timer mean located at said first location between the output of said code detector means and the control input of said switch means so that said switch means remains in an enabled state for a predetermined length of time after the coded signal is no longer received at said first location.

8. Apparatus according to claim 1, further including a transmitter connected to the output of said control means and a receiver connected to the input of said code detector means thereby providing a separate channel through which said coded signal is passed from said second location to said first location.

9. Apparatus according to claim 1, wherein there is a plurality of means at said first location each having a means for receiving said coded signal and comparing the same with said stored signal, and each have a switch means connected to enable a critical operational component of said vehicle.

* * * * *